US009487167B2

(12) United States Patent
Graumann et al.

(10) Patent No.: US 9,487,167 B2
(45) Date of Patent: Nov. 8, 2016

(54) VEHICULAR SPEECH RECOGNITION GRAMMAR SELECTION BASED UPON CAPTURED OR PROXIMITY INFORMATION

(75) Inventors: David L. Graumann, Portland, OR (US); Barbara Rosario, Berkeley, CA (US)

(73) Assignee: Intel Corporation, Santa Clara, CA (US)

(*) Notice: Subject to any disclaimer, the term of this patent is extended or adjusted under 35 U.S.C. 154(b) by 149 days.

(21) Appl. No.: 13/977,535

(22) PCT Filed: Dec. 29, 2011

(86) PCT No.: PCT/US2011/067847
§ 371 (c)(1),
(2), (4) Date: Apr. 29, 2014

(87) PCT Pub. No.: WO2013/101066
PCT Pub. Date: Jul. 4, 2013

(65) Prior Publication Data
US 2014/0229174 A1    Aug. 14, 2014

(51) Int. Cl.
*G10L 15/183* (2013.01)
*B60R 16/037* (2006.01)
(Continued)

(52) U.S. Cl.
CPC ......... *B60R 16/0373* (2013.01); *G06F 3/017* (2013.01); *G06F 3/04883* (2013.01);
(Continued)

(58) Field of Classification Search
CPC ... G10L 15/08; G10L 15/18; G10L 15/1815; G10L 15/183; G10L 15/19; G10L 15/193; G10L 2015/226; G10L 2015/228; B06R 16/0373

USPC .......................... 704/251, 257, 275
See application file for complete search history.

(56) References Cited

U.S. PATENT DOCUMENTS 5,699,456 A * 12/1997 Brown ............... G06K 9/00429
382/190
6,430,531 B1 * 8/2002 Polish ..................... G10L 15/22
704/257

(Continued)

FOREIGN PATENT DOCUMENTS

JP    H09034488    2/1997
JP    2001-216069    8/2001

(Continued)

OTHER PUBLICATIONS

Clark, Adrian, et al. "Seamless interaction in space." Proceedings of the 23rd Australian Computer-Human Interaction Conference. ACM, Dec. 2011, pp. 88-97.*

(Continued)

*Primary Examiner* — James Wozniak
(74) *Attorney, Agent, or Firm* — Sutherland Asbill & Brennan LLP

(57) ABSTRACT

Speech recognition systems and/or techniques are provided in which grammar elements and/or speech inputs are targeted to selected functions. One or more input capture devices facilitate the collection of user input associated with a vehicle, and a vehicle function may be selected based upon received user input. A subset of available grammar elements that are associated with audible commands for the selected function may then be identified and utilized to evaluate received audio input. In this regard, speech recognition may be targeted to the selected function.

30 Claims, 6 Drawing Sheets

(51) Int. Cl.
*G06K 9/00* (2006.01)
*G06F 3/01* (2006.01)
*G06F 3/0488* (2013.01)
*G06F 3/16* (2006.01)
*G10L 15/22* (2006.01)

(52) U.S. Cl.
CPC .......... *G06F3/167* (2013.01); *G06K 9/00355* (2013.01); *G10L 15/183* (2013.01); *G10L 15/22* (2013.01); *B60W 2420/42* (2013.01); *B60W 2540/02* (2013.01); *G06F 2203/0381* (2013.01); *G06F 2203/04108* (2013.01); *G10L 2015/228* (2013.01)

(56) References Cited

U.S. PATENT DOCUMENTS

| | | | |
|---|---|---|---|
| 6,574,595 B1* | 6/2003 | Mitchell | G10L 15/22 704/242 |
| 6,868,383 B1* | 3/2005 | Bangalore | G06K 9/00355 704/251 |
| 7,043,436 B1* | 5/2006 | Ryu | G10L 13/00 704/258 |
| 7,085,710 B1 | 8/2006 | Beckert et al. | |
| 7,149,694 B1* | 12/2006 | Harb | G10L 15/063 704/270.1 |
| 7,395,206 B1* | 7/2008 | Irwin | G10L 15/26 704/270 |
| 7,630,900 B1* | 12/2009 | Strom | 704/270 |
| 7,986,974 B2 | 7/2011 | Arun | |
| 8,566,087 B2* | 10/2013 | Cross, Jr. | 704/231 |
| 8,700,392 B1* | 4/2014 | Hart | G10L 15/25 704/231 |
| 2001/0047258 A1* | 11/2001 | Rodrigo | H04L 29/06 704/275 |
| 2002/0069065 A1* | 6/2002 | Schmid | G06F 9/4428 704/270 |
| 2002/0133354 A1* | 9/2002 | Ross | G10L 15/30 704/275 |
| 2003/0212544 A1* | 11/2003 | Acero | G06F 17/2785 704/9 |
| 2005/0091036 A1* | 4/2005 | Shackleton | G06F 17/271 704/9 |
| 2005/0131695 A1* | 6/2005 | Lucente | G10L 15/22 704/257 |
| 2005/0261901 A1* | 11/2005 | Davis | G10L 15/19 704/235 |
| 2006/0074671 A1* | 4/2006 | Farmaner | G10L 15/193 704/257 |
| 2006/0085115 A1* | 4/2006 | Ilan | B60R 16/0373 701/49 |
| 2007/0050191 A1* | 3/2007 | Weider | G06F 17/30864 704/275 |
| 2007/0213984 A1* | 9/2007 | Ativanichayaphong | G06F 3/167 704/257 |
| 2007/0233488 A1* | 10/2007 | Carus | G10L 15/183 704/257 |
| 2007/0255552 A1* | 11/2007 | Thiesson | G06F 17/3087 704/8 |
| 2007/0283296 A1 | 12/2007 | Nilsson | |
| 2008/0071547 A1 | 3/2008 | Prieto et al. | |
| 2008/0140390 A1* | 6/2008 | Xia | G06F 9/52 704/10 |
| 2008/0154604 A1* | 6/2008 | Sathish | 704/257 |
| 2009/0055178 A1* | 2/2009 | Coon | B60R 16/0373 704/246 |
| 2009/0055180 A1* | 2/2009 | Coon | B60R 16/0373 704/251 |
| 2009/0089059 A1* | 4/2009 | Ma | G10L 15/06 704/254 |
| 2009/0150156 A1* | 6/2009 | Kennewick | G06Q 30/0261 704/257 |
| 2009/0150160 A1* | 6/2009 | Mozer | G06F 3/011 704/275 |
| 2010/0185445 A1* | 7/2010 | Comerford | G10L 15/22 704/251 |
| 2010/0312469 A1* | 12/2010 | Chen | G01C 21/3608 701/408 |
| 2011/0022393 A1* | 1/2011 | Waller | G01C 21/3608 704/270 |
| 2011/0161077 A1* | 6/2011 | Bielby | G10L 15/32 704/231 |
| 2011/0313768 A1* | 12/2011 | Klein | G06F 3/017 704/251 |
| 2012/0151420 A1* | 6/2012 | Amento | G06F 3/017 715/863 |
| 2012/0173067 A1* | 7/2012 | Szczerba | G02B 27/01 701/23 |
| 2012/0226498 A1* | 9/2012 | Kwan | G06K 9/00335 704/233 |
| 2013/0339027 A1* | 12/2013 | Dokor | G06F 17/20 704/275 |

FOREIGN PATENT DOCUMENTS

| | | |
|---|---|---|
| JP | 2003-005781 | 1/2003 |
| WO | 2013/101066 A1 | 7/2013 |

OTHER PUBLICATIONS

International Search Report and Written Opinion received for PCT Application No. PCT/US2011/067847, mailed on Sep. 24, 2012, 9 pages.
Office Action for Japanese Patent Application 2014-548779 mailed Jul. 28, 2015. 2 Pages English Translation.
Extended European Search Report for European Patent Application 11879105.2 mailed Sep. 2, 2015.
International Preliminary Report on Patentability and Written Opinion received for PCT Patent Application No. PCT/US2011/067847, mailed on Jul. 10, 2014, 6 pages.
Office Action from Chinese Patent Application No. 201180076089 mailed Oct. 26, 2015. 10 Pages Chinese Office Action. English Translation not available.
Office Action from Chinese Application No. 201180076089A mailed Jun. 8, 2016. (7 pgs., including 4 pgs. translation).

\* cited by examiner

VEHICULAR SPEECH RECOGNITION GRAMMAR SELECTION BASED UPON CAPTURED OR PROXIMITY INFORMATION

TECHNICAL FIELD

Aspects of the disclosure relate generally to speech recognition, and more particularly, to the targeting of speech recognition to specific functions associated with a vehicle.

BACKGROUND

Speech recognition technology has been increasingly deployed for a variety of purposes, including electronic dictation, voice command recognition, and telephone-based customer service engines. Speech recognition typically involves the processing of acoustic signals that are received via a microphone. In doing so, a speech recognition engine is typically utilized to interpret the acoustic signals into words or grammar elements. In certain environments, such as vehicular environments, the use of speech recognition technology enhances safety because drivers are able to provide instructions in a hands-free manner.

Conventional in-vehicle speech interfaces typically utilize a hierarchy of grammar elements to control various vehicle functions. For example, in order to tune a radio, a user might state "radio," listen for confirmation, state "channel," listen for confirmation, and then state "101.9." The conventional hierarchical approach is typically cumbersome and time consuming for a user. Several attempts have been made to flatten out speech hierarchies in order to permit more direct commands. These attempts include the use of larger vocabulary sizes and the addition of natural language processing. However, only marginal improvements have been obtained. Indeed, the use of relatively small vocabularies with rich phonemic signatures appears to provide more accurate speech recognition results under varying acoustical conditions associated with a vehicle. Accordingly, there is an opportunity for improved systems and methods for targeting speech recognition to specific functions associated with a vehicle.

BRIEF DESCRIPTION OF THE FIGURES

Reference will now be made to the accompanying drawings, which are not necessarily drawn to scale, and wherein.

DETAILED DESCRIPTION

Figure 1:
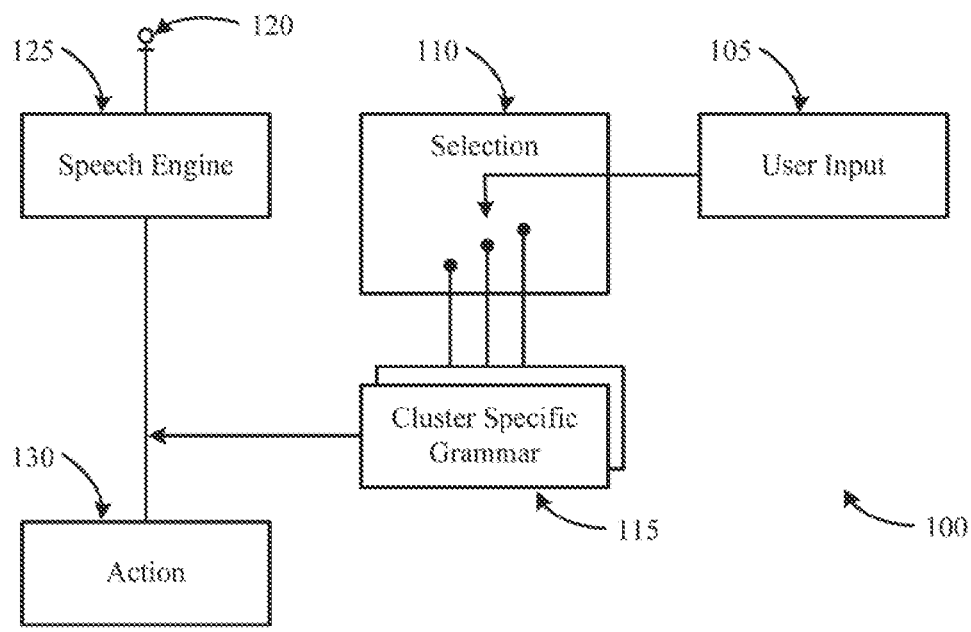
FIG. 1 is a block diagram of an example system or architecture that may be utilized to target speech input to various vehicle functions, according to an example embodiment of the disclosure.

Embodiments of the disclosure may provide systems, methods, and apparatus for targeting speech recognition to any number of functions associated with a vehicular or other environment. In this regard, a hierarchy of grammar elements associated with a plurality of different functions and/or applications may be avoided, thereby leading to relatively quicker processing of final commands and to a higher level of user satisfaction. In certain embodiments, a subset or cluster of function-specific grammar elements may be associated with each function. For example, a first subset of grammar elements may be associated with a radio function (or other function), and a second subset of grammar elements may be associated with a climate function (or other function). Based upon the identification and evaluation of user input, which may be user input other than speech input, a desired function and its associated subset of grammar elements may be selected. The subset of grammar elements may then be utilized to process speech input associated with and targeted to the selected function.

Various embodiments may be utilized in conjunction with a wide variety of different operating environments. For example, certain embodiments may be utilized in a vehicular environment. As desired, acoustic models within the vehicle may be optimized for use with specific hardware and various internal and/or external acoustics. Examples of suitable vehicles include, but are not limited to, cars, trucks, light-duty trucks, heavy-duty trucks, pickup trucks, minivans, crossover vehicles, vans, commercial vehicles, private vehicles, sports utility vehicles, tractor-trailers, aircraft, airplanes, jets, helicopters, space vehicles, watercraft, or any other suitable vehicle with communicative and sensory capability. However, it will be appreciated that embodiments of the disclosure may also be utilized in other transportation or non-transportation related applications where electronic communication between two systems may be implemented.

In one example embodiment, a plurality of grammar elements associated with audible commands (e.g., voice commands) may be associated with a vehicle. For example, the grammar elements may be stored in association with a suitable speech recognition system or component of the vehicle. The plurality of grammar elements may include respective grammar elements associated with any number of vehicle functions. The vehicle functions may include, for example, a vehicle control function, a climate control function, an audio system function, a window (e.g., windows, sunroof, etc.) control function, a seat control function, a display control function, a navigation control function, a Web or other network function, a communications control function, and/or any other functions associated with a wide variety of vehicle systems, components, and/or applications. In certain embodiments, a subset of the plurality of grammar elements may be associated with each of the vehicle functions. For example, a relatively small vocabulary of grammar elements may be associated with each function.

According to an aspect of the disclosure, user input may be identified and evaluated in order to select a desired vehicle function. In this regard, the grammar elements associated with the selected function, which may be a subset of the plurality of grammar elements (or which may be separately stored and/or obtained from any number of suitable data sources), may be identified. A wide variety of different types of user inputs may be identified as desired in various embodiments, including but not limited to, a user gesture, user proximity to an input element, and/or user selection of an input element. For example, an image capture device (e.g., a camera, etc.) may be utilized to collect images of an object of interest (e.g., a user's hand, etc.), and the collected images may be evaluated and/or processed to identify a gesture made by the user. A wide variety of different types of gestures may be identified as desired, such as a gesture associated with a hand movement (e.g., complete hand movement, finger movement, etc.) and/or a gesture associated with an indication of (e.g., contact with, proximity to, pointing to etc.) a defined region of interest within the vehicle. A desired function may then be identified or selected based at least in part upon an evaluation of the gesture. As another example, one or more proximity detectors and/or proximity sensors may be utilized to determine when the user (e.g., a user's hand, etc.) is in proximity to an input element (e.g., a switch, button, knob, input region, etc.), and a desired function may be identified or selected based upon the determined proximity. As yet another example, a user selection of an input element (e.g., a switch, knob, etc.) may be identified and utilized to identify or select a function associated with the input element.

Once a desired function has been identified, a set of grammar elements associated with the function may be utilized to process received audio input, such as speech input. Audio input may be collected by any number of suitable audio capture devices, such as one or more microphones. In certain embodiments, the collection or capture of audio input may be initiated based at least in part upon the identified user input. For example, when an input element selection or gesture is identified (or the onset of a gesture is identified), a microphone may be turned on. In other embodiments, the identified user input may be utilized to identify relevant collected audio input. For example, a buffer may be utilized to store recently collected audio input. Once a user input is identified, audio input captured immediately prior to, during, and/or immediately after the user input may be identified. In either case, the collected audio may be evaluated utilizing the grammar elements associated with the identified function. In this regard, a grammar element (or plurality of grammar elements) or command associated with the function may be identified as corresponding to the collected audio input. Once a grammar element (or plurality of grammar elements) has been identified as matching or otherwise corresponding to the audio input, a wide variety of suitable information may be output, such as an indication of the identified grammar element or a control signal associated with the function. For example, if an audio system function has been identified, then an "up" command may be identified and processed in order to turn the volume of the radio up. As another example, if a window function has been identified, then an "up" command may be identified and processed in order to roll a window up.

Additionally, in certain embodiments, a user may be permitted to associate desired user inputs and/or grammar elements with various functions. For example, a learn new input function or indication may be identified (e.g., identified based upon user input), and one or more user inputs (e.g., gestures, proximities to input elements, selection of input elements, etc.) may be tracked based upon the learn new input indication. The tracked one or more user inputs may then be associated with a desired function, such as a function selected and/or otherwise specified by a user. Additionally, as desired, audio input provided by the user (e.g., spoken words and/or phrases, etc.) may be collected and utilized to generate one or more grammar elements associated with the desired function.

Certain embodiments will now be described more fully hereinafter with reference to the accompanying drawings, in which various embodiments and/or aspects are shown. However, various aspects may be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

System Overview

FIG. 1 is a block diagram of an example system 100 or architecture that may be utilized to target speech input to various vehicle functions, according to an example embodiment of the disclosure. The system 100 may include a wide variety of hardware and/or functional components, such as a user input component 105, a selection component 110, any number of sets or clusters of function-specific grammars 115, an audio capture component 120, a speech engine 125, and/or an action component 130. Each of these components will be described in greater detail below. Additionally, it will be appreciated that the system 100 of FIG. 1 may be embodied in a wide variety of suitable forms, including but not limited to various systems, apparatus, and/or computer-readable media that are executed by one or more processors. One example detailed embodiment of the system 100 illustrated in FIG. 1 is described in greater detail below with reference to FIG. 3.

With reference to FIG. 1, the user input component 105 may facilitate the collection, determination, and/or identification of one or more user inputs associated with a vehicle. A wide variety of different types of user inputs may be collected and/or identified as desired including, but not limited to, gestures made by a user, user proximity to one or more input elements, and/or user selection of one or more input elements (e.g., physical input elements such as switches, knobs, buttons, etc.). As desired, a wide variety of suitable user input collection devices may be utilized to collect and/or identify user input, such as one or more image capture devices, one or more proximity sensors, and/or one or more input elements.

Based at least in part upon an evaluation of the information collected by and/or determined by the user input component 105, the selection component 110 may identify or determine a function associated with the vehicle. A wide variety of function-specific information may then be identified and/or selected by the selection component 110. For example, a set of grammar elements (e.g., voice commands, etc.) associated with the function may be selected. In certain embodiments, a set or cluster of function-specific grammars 115 associated with the function may be selected. In this regard, the received user input may be utilized to target speech recognition to grammar elements associated with a desired function.

The audio capture component 120 may be utilized to collect or capture audio input associated with a user. For example, a microphone may be utilized to collect an audio signal including voice commands (e.g., words, phrases, etc.) spoken by a user. The speech engine 125 may receive the audio input and evaluate the received audio input utilizing the grammar elements associated with the selected or desired function. In this regard, the speech engine 125 may identify a grammar element or voice command associated with the selected function. A wide variety of suitable speech recognition algorithms and/or techniques may be utilized as desired to identify a grammar element or voice command spoken by the user. Additionally, once a grammar element has been identified, a wide variety of suitable outputs, instructions, and/or control actions may be taken. For example, the action component 130 may generate one or more control signals that are provided to any number of vehicle applications and/or components associated with the selected function. As another example, the action component 130 may translate a received and identified voice command into a format that may be processed by an application associated with the selected function.

Figure 2:
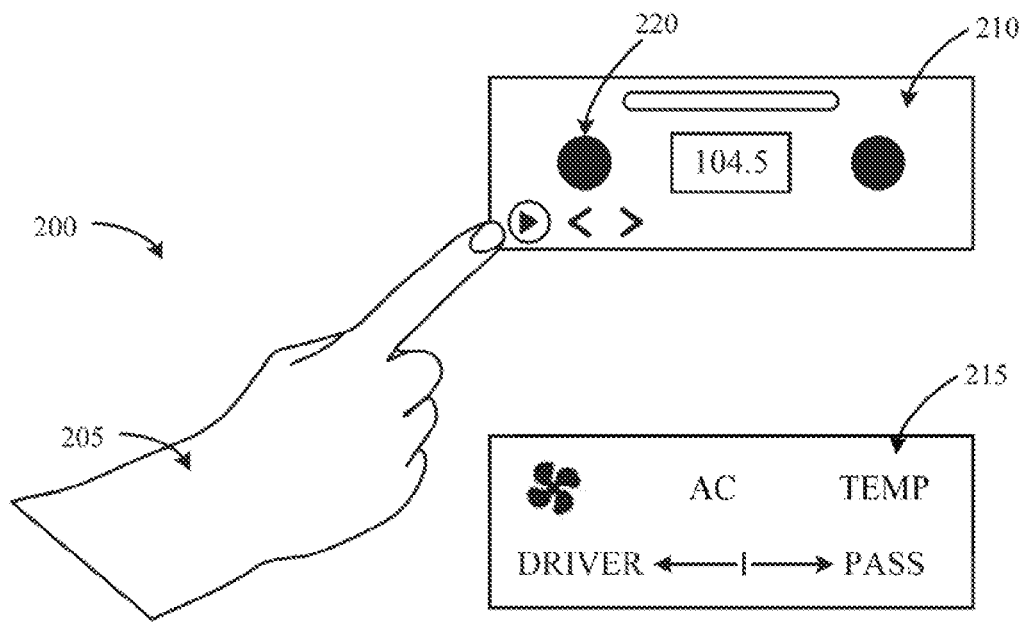
FIG. 2 is a simplified schematic diagram illustrating example techniques for obtaining user input associated with targeted speech recognition.

FIG. 2 is a simplified schematic diagram 200 illustrating example techniques for obtaining user input associated with targeted speech recognition. With reference to FIG. 2, a user's hand 205, a vehicle audio control panel 210, and a vehicle climate control panel 215 are depicted. The audio control panel 210 may be associated with one or more audio control functionalities, and the climate control panel 215 may be associated with one or more climate control functionalities. As desired, each of the control panels 210, 215 may include any number of physical input elements, such as various knobs, buttons, switches, and/or touch screen displays. In other embodiments, each of the control panels may include or be associated with one or more proximity sensors configured to detect proximity of the user's hand 205 (or other object). In yet other embodiments, each of the control panels (and/or their underlying functions) may be associated with one or more designated input regions within the vehicle. For example, a designated input region on the dash, console, or other location within the vehicle may be associated with audio controls. In certain embodiments, a designated input region may include one or more proximity sensors.

A wide variety of suitable methods and/or techniques may be utilized as desired to identify, collect, and/or obtain user input associated with the control panels 210, 215 and/or their underlying functions. For example, the motion of the user's hand may be tracked in order to identify a gesture indicative of a control panel or underlying function. A wide variety of different types of gestures may be identified. As one example, a predetermined motion (or series of motions) associated with an audio control function may be identified based upon tracking hand 205 and/or finger movement. As another example, the user may point to a control panel or associated input region, and the pointing may be identified as a gesture. As yet another example, a proximity between the hand 205 and a control panel or an associated input region may be identified as a gesture based upon an evaluation of image data. Any of the identified gestures may be evaluated in order to select a desired underlying function, such as a function associated with one of the control panels 210, 215.

As another example user input, one or more proximity sensors may be utilized to detect and/or determine proximity between the user's hand 205 and a control panel and/or an input element (e.g., a physical input element, an input region, etc.) associated with the control panel. A desired function may then be selected based at least in part upon an evaluation of the determined proximity. For example, an audio control function may be selected based upon a determined proximity between the user's hand 205 and the audio control panel 210. As another example, an audio tuning function (e.g., radio tuning, satellite radio tuning, etc.) may be selected based upon a determined proximity between the user's hand 205 and a tuning input element (e.g. a tuning knob, etc.) associated with the audio control panel 210. Indeed, with any of the described types of user inputs, a subset of applicable grammar elements for a function may be identified with varying degrees of particularity.

As yet another example user input, a user may utilize his or her hand to select one or more physical input elements (e.g., knobs, buttons, switches, and/or elements of one or more touch screen displays). A desired function may then be selected based at least in part upon the selected physical input elements. For example, if one or more input elements associated with the audio control panel 210 are selected, then an audio control function may be selected. As another example, a specific selected input element, such as a volume input element 220 may be identified, and a function associated with the selected input element (e.g., a volume adjustment function, etc.) may be identified. Alternatively, grammar elements associated with a higher level function may be weighted towards a specific lower level function associated with the selected input element. For example, if a volume input element 220 is selected, then an audio control function may be selected; however, while an identified set of grammar elements associated with audio control functionality is identified, certain commands may be weighted towards volume control. For example, a received command of "up" may result in increased audio volume; however, non-volume audio commands will still be processed. As another example, had a tuning input element been selected, then the received command of "up" may result in tuning an audio component in an upward direction.

The methods and/or techniques described above with reference to FIG. 2 are provided by way of example only. A wide variety of other types of user inputs and/or various combinations of user inputs may be identified and utilized to target speech recognition.

Figure 3:
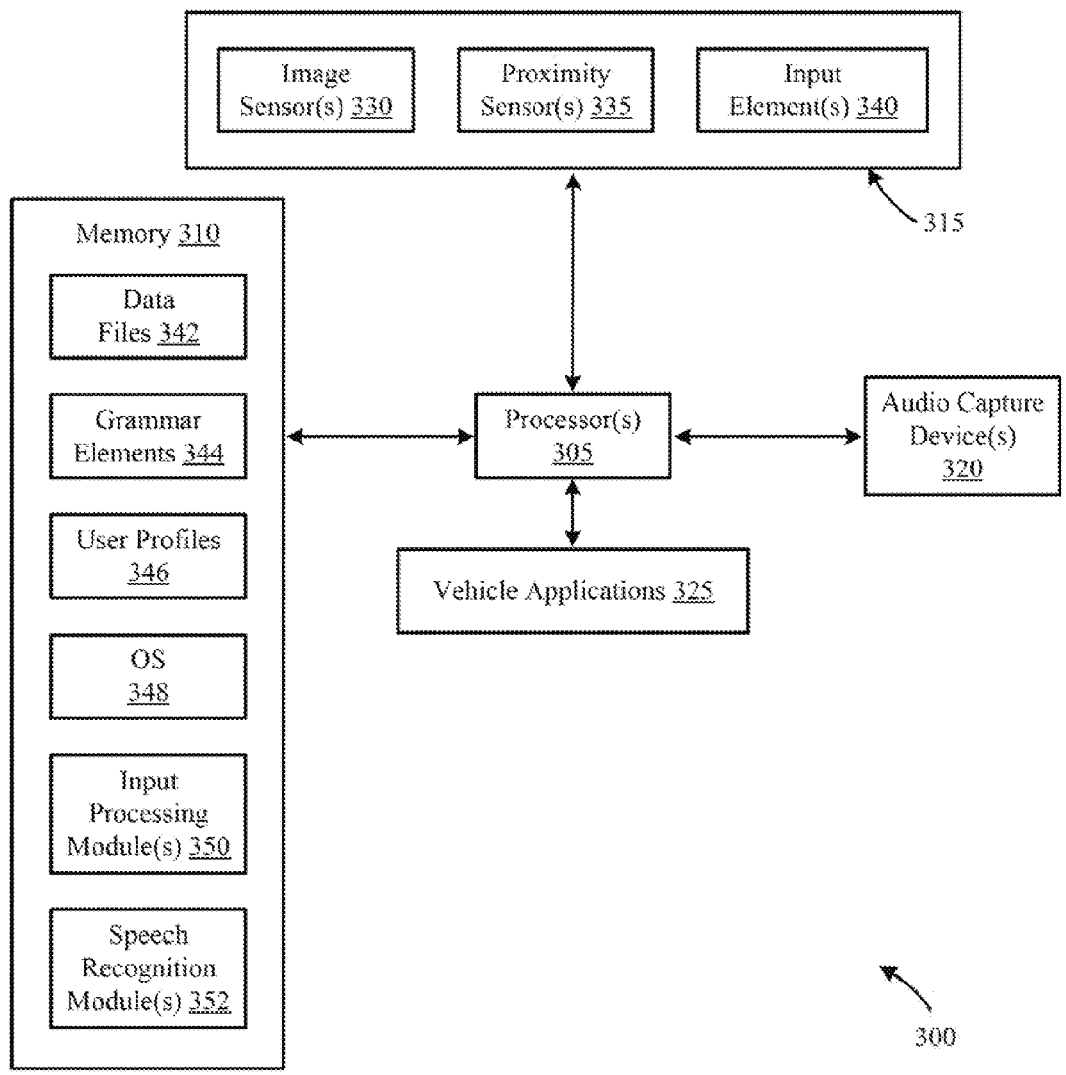
FIG. 3 is a block diagram of an example speech recognition system or architecture that may be utilized in various embodiments of the disclosure.

FIG. 3 is a block diagram of an example speech recognition system 300 or architecture that may be utilized in various embodiments of the disclosure. In certain embodiments, the system 300 may be implemented or embodied as a speech recognition system. In other embodiments, the system 300 may be implemented or embodied as a component of another system or device, such as an in-vehicle infotainment ("IVI") system associated with a vehicle. In yet other embodiments, one or more suitable computer-readable media may be provided for processing user inputs and/or speech inputs. These computer-readable media may include computer-executable instructions that are executed by one or more processing devices in order to process user inputs and/or associated speech inputs. As used herein, the term "computer-readable medium" describes any form of suitable memory or memory device for retaining information in any form, including various kinds of storage devices (e.g., magnetic, optical, static, etc.). Indeed, various embodiments of the disclosure may be implemented in a wide variety of suitable forms.

As desired, the system 300 may include any number of suitable computing devices associated with suitable hardware and/or software for processing user inputs and/or associated speech inputs. These computing devices may also include any number of processors for processing data and executing computer-executable instructions, as well as other internal and peripheral components that are well-known in the art. Further, these computing devices may include or be in communication with any number of suitable memory devices operable to store data and/or computer-executable instructions. By executing computer-executable instructions, a special purpose computer or particular machine for targeting speech input to various vehicle functions may be formed.

With reference to FIG. 3, the system 300 may include one or more processors 305 and memory devices 310 (generally referred to as memory 310). Additionally, the system may include any number of other components in communication with the processors 305, such as any number of input/output ("I/O") devices 315, any number of vehicle audio capture devices 320 (e.g., a microphone), and/or any number of suitable applications 325. The I/O devices 315 may include any suitable devices and/or components utilized to capture user input utilized to target speech recognition, such as one or more image capture devices or image sensors 330, any number of proximity sensors 335, and/or any number of input elements 340 (e.g., buttons, knobs, switches, touch screen displays, etc.). Additionally, as desired, the I/O devices 315 may include a wide variety of other components that facilitate user interactions, such as one or more display devices.

The processors 305 may include any number of suitable processing devices, such as a central processing unit ("CPU"), a digital signal processor ("DSP"), a reduced instruction set computer ("RISC"), a complex instruction set computer ("CISC"), a microprocessor, a microcontroller, a field programmable gate array ("FPGA"), or any combination thereof. As desired, a chipset (not shown) may be provided for controlling communications between the processors 305 and one or more of the other components of the system 300. In one embodiment, the system 300 may be based on an Intel® Architecture system, and the processors 305 and chipset may be from a family of Intel® processors and chipsets, such as the Intel® Atom® processor family. The processors 305 may also include one or more processors as part of one or more application-specific integrated circuits ("ASICs") or application-specific standard products ("AS-SPs") for handling specific data processing functions or tasks. Additionally, any number of suitable I/O interfaces and/or communications interfaces (e.g., network interfaces, data bus interfaces, etc.) may facilitate communication between the processors 305 and/or other components of the system 300.

The memory 310 may include any number of suitable memory devices, such as caches, read-only memory devices, random access memory ("RAM"), dynamic RAM ("DRAM"), static RAM ("SRAM"), synchronous dynamic RAM ("SDRAM"), double data rate ("DDR") SDRAM ("DDR-SDRAM"), RAM-BUS DRAM ("RDRAM"), flash memory devices, electrically erasable programmable read only memory ("EEPROM"), non-volatile RAM ("NVRAM"), universal serial bus ("USB") removable memory, magnetic storage devices, removable storage devices (e.g., memory cards, etc.), and/or non-removable storage devices. As desired, the memory 310 may include internal memory devices and/or external memory devices in communication with the system 300. The memory 310 may store data, executable instructions, and/or various program modules utilized by the processors 305. Examples of data that may be stored by the memory 310 include data files 342, information associated with grammar elements 344, information associated with one or more user profiles 346, and/or any number of suitable program modules and/or applications that may be executed by the processors 305, such as an operating system ("OS") 348, one or more input processing modules 350, and/or one or more speech recognition modules 352.

The data files 342 may include any suitable data that facilitates the operation of the system 300, the identification and processing of user input, and/or the processing of speech input. For example, the stored data files 342 may include, but are not limited to, information associated with the identification of users, information associated with vehicle functions, information associated with respective grammar elements for the vehicle functions, information associated with the identification of various types of user inputs, information associated with the vehicle applications 325, and/or a wide variety of other vehicle and/or speech recognition-related information. The grammar element information 344 may include a wide variety of information associated with a plurality of different grammar elements (e.g., commands, speech inputs, etc.) that may be recognized by the speech recognition modules 352. For example, the grammar element information 344 may include a plurality of grammar elements associated with any number of functions. The plurality of grammar elements may be grouped into any number of subsets associated with various functions. The user profiles 346 may include a wide variety of user preferences and/or parameters associated with various users (e.g., various drivers of a vehicle, etc.) including, but not limited to, identification information for one or more users, user preferences associated with the processing of speech input, user preferences associated with grammar elements to be associated with various functions, and/or user preferences associated with inputs to be associated with various functions.

The OS 348 may be a suitable module or application that facilitates the general operation of the system 300, as well as the execution of other program modules, such as the input processing modules 350 and/or the speech recognition modules 352. The input processing modules 350 may include any number of suitable software modules and/or applications that facilitate the identification of user inputs and/or the selection of functions based at least in part upon the user inputs. In operation, an input processing module 350 may receive user input data and/or data from one or more I/O devices 315, such as measurements data, image data, and/or data associated with selected input elements. As desired, the input processing module 350 may evaluate the received data in order to identify a function associated with user input. In this regard, grammar elements associated with the function may be identified and/or determined. Additionally, an identification of the function may be provided to the speech recognition modules 352. In this regard, the function-specific grammar elements may be evaluated in conjunction with received audio input, and targeted speech recognition may be performed.

A wide variety of different types of user inputs may be identified by the input processing modules 350 as desired in various embodiments including, but not limited to, a user gesture, user proximity to an input element, and/or user selection of an input element. For example, an image sensor 330 (e.g., a camera, etc.) may be utilized to collect images of an object of interest (e.g., a user's hand, etc.), and the collected images may be evaluated and/or processed by the input processing modules 350 to identify a gesture made by the user. A wide variety of different types of gestures may be identified as desired, such as a gesture associated with a hand movement (e.g., complete hand movement, finger movement, etc.) and/or a gesture associated with an indication of (e.g., contact with, proximity to, pointing to, etc.) a defined region of interest within the vehicle. A desired function may then be identified or selected based at least in part upon an evaluation of the gesture. As another example, one or more proximity sensors 335 may be utilized to determine when the user (e.g., a user's hand, etc.) is in proximity with an input element (e.g., a switch, button, knob, input region, etc.), and a desired function may be identified or selected based upon the determined proximity. As yet another example, a user selection of one or more input elements 340 (e.g. a switch, knob, etc.) may be identified and utilized to identify or select a function associated with the one or more input elements 340.

The speech recognition modules 352 may include any number of suitable software modules and/or applications that facilitate the processing of received speech input. In operation, a speech recognition module 352 may identify applicable grammar elements associated with a vehicle function, such as a function selected based upon the evaluation of user input. In certain embodiments, the applicable grammar elements for a function may be a subset of a plurality of grammar elements available for processing by the speech recognition modules 352. Additionally, the grammar elements may be accessed and/or obtained from a wide variety of suitable sources, such as internal memory and/or any number of external devices (e.g., network servers, cloud servers, user devices, etc.).

Once an audio input or speech input is received for processing, the speech recognition module 352 may evaluate the speech input in light of the function-specific grammar elements in order to determine or identify a correspondence between the received speech input and a grammar element. Once a grammar element (or plurality of grammar elements) has been identified as matching the speech input, the speech recognition module 352 may generate and/or output a wide variety of information associated with the grammar element. For example, an identified grammar element may be translated into an input that is provided to an executing vehicle application 325. In this regard, voice commands may be identified and dispatched to vehicle relevant applications 325. As another example, the identified grammar element may be processed in order to generate one or more control signals and/or commands that are provided to a vehicle application 325, a vehicle system, and/or a vehicle component. In certain embodiments, a recognized speech input may be processed in order to generate output information (e.g., audio output information, display information, messages for communication, etc.) for presentation to a user. For example, an audio output associated with the recognition and/or processing of a voice command may be generated and output. As another example, a visual display may be updated based upon the processing of a voice command.

As desired, the input processing modules 350 and/or the speech recognition modules 352 may be implemented as any number of suitable modules. Alternatively, a single module may perform the functions of both the input processing modules 350 and the speech recognition modules 352. A few examples of the operations of the input processing modules 350 and/or the speech recognition modules 352 are described in greater detail below with reference to FIGS. 4-7.

With continued reference to FIG. 3, the I/O devices 315 may include any number of suitable devices and/or components that facilitate the collection of information to be provided to the processors 305 and/or the input processing modules 350. Examples of suitable input devices include, but are not limited to one or more image sensors 330 or image collection devices (e.g. a camera, etc.), any number of proximity sensors 335, any number of suitable input elements 340. As desired, the I/O devices 315 may additionally include any number of suitable output devices that facilitate the output of information to users. Examples of suitable output devices include, but are not limited to, one or more speakers and/or one or more displays. The displays may include any number of suitable display devices, such as a liquid crystal display ("LCD"), a light-emitting diode ("LED") display, an organic light-emitting diode ("OLED") display, and/or a touch screen display. Other suitable input and/or output devices may be utilized as desired.

The image sensors 330 may include any known devices that convert optical images to an electronic signal, such as cameras, charge-coupled devices ("CCDs"), complementary metal oxide semiconductor ("CMOS") sensors, or the like. In operation, data collected by the image sensors 330 may be processed in order to determine or identify a wide variety of suitable information. For example, image data may be evaluated in order to identify users, detect user indications, and/or to detect user gestures.

The proximity sensors 335 may include any known devices configured to detect the presence of nearby objects, such as a user's hand. In certain embodiments, presence may be detected without any physical contact between an object and a proximity sensor. Certain proximity sensors 335 may emit an electromagnetic field or a beam of electromagnetic radiation (e.g., infrared radiation, etc.). Changes in the emitted field and/or the identification of a return signal may then be determined and utilized to identify the presence and/or proximity of an object. Additionally, as desired, a proximity sensor 335 may be associated with any suitable nominal range associated with the detection of an object or target.

The input elements 340 may include any number of suitable physical components and/or devices configured to receive user input, as well as any number of predefined input regions associated with the receipt of user input. Examples of suitable physical input elements include, but are not limited to, buttons, knobs, switches, touch screens, capacitive sensing elements, etc. Upon actuation and/or selection by a user, a physical input element may generate data (e.g., an electrical signal, etc.) that is provided either directly or indirectly to the input processing modules 350 for evaluation. Alternatively, identification information associated with a user selection (e.g., an identification of selected input elements and/or associated functions, etc.) may be provided to the input processing modules 350. An input region may be a suitable area or region of interest within a vehicle that is associated with a function. For example, designated input regions on the dash, console, or other location within the vehicle may be associated with various functions. In certain embodiments, a gesture associated with an input region (e.g., a user pointing to an input region, user motion in proximity to an input region, etc.) may be identified and evaluated in order to select a function associated with the input region. In other embodiments, a designated input region may include one or more proximity sensors.

The audio capture devices 320 may include any number of suitable devices, such as microphones, for capturing audio signals and/or voice input, such as spoken words and/or phrases. The audio capture devices 320 may include microphones of any known type including, but not limited to, condenser microphones, dynamic microphones, capacitance diaphragm microphones, piezoelectric microphones, optical pickup microphones, and/or various combinations thereof. In operation, an audio capture device 320 may collect sound waves and/or pressure waves, and provide collected audio data (e.g., voice data) to the processors 305 and/or the speech recognition modules 352 for evaluation. In this regard, various speech inputs may be recognized. Additionally, in certain embodiments, collected voice data may be compared to stored profile information in order to identify one or more users.

With continued reference to FIG. 3, any number of vehicle applications 325 may be associated with the system 300. As desired, information associated with recognized speech inputs may be provided to the applications 325. In certain embodiments, one or more of the applications 325 may be executed by the processors 305. As desired, one or more of the applications 325 may be executed by other processing devices in communication (e.g., network communication) with the processors 305. In an example vehicular embodiment, the applications 325 may include any number of vehicle applications associated with a vehicle including, but not limited to, one or more vehicle control applications, a climate control application, an audio system application, a window (e.g., windows, sunroof, etc.) control application, a seat control application, a display control application, a navigation control application, a Web or other network application, a communications control application, a maintenance application, an application that manages communication with user devices and/or other vehicles, an application that monitors vehicle parameters, and/or any other suitable applications.

The system 300 or architecture described above with reference to FIG. 3 is provided by way of example only. As desired, a wide variety of other systems and/or architectures may be utilized to perform targeted processing of speech inputs. These systems and/or architectures may include different components and/or arrangements of components than that illustrated in FIG. 3.

Operational Overview

Figure 4:
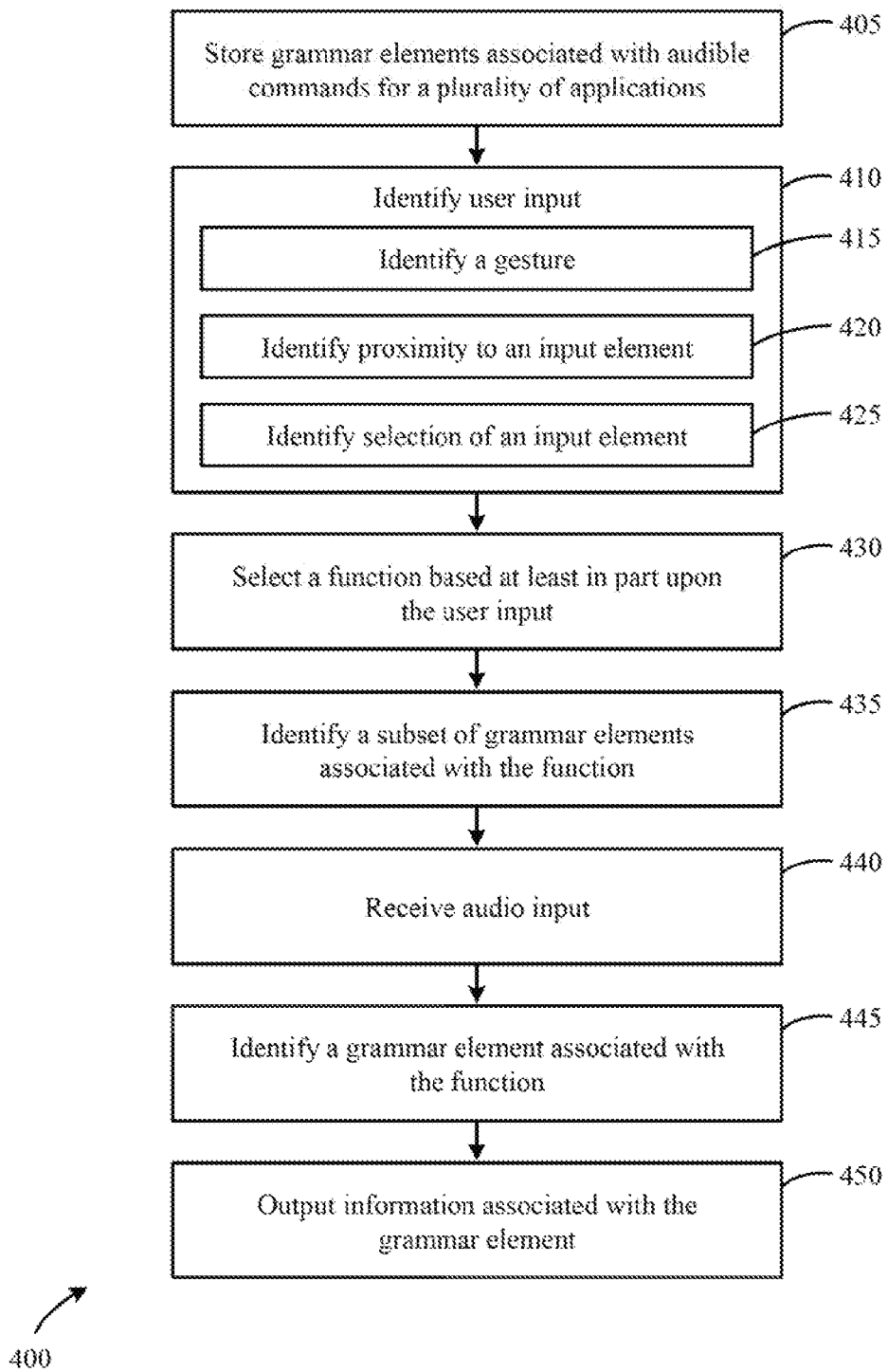
FIG. 4 is a flow diagram of an example method for evaluating user input to target speech recognition to a vehicle function.

FIG. 4 is a flow diagram of an example method 400 for evaluating user input to target speech recognition to a vehicle function. In certain embodiments, the operations of the method 400 may be performed by a suitable speech recognition system and/or one or more associated modules and/or applications, such as the speech recognition system 300 and/or the associated input processing modules 350 and/or speech recognition modules 352 illustrated in FIG. 3. The method 400 may begin at block 405.

At block 405, grammar elements associated with any number of respective audible commands for a plurality of vehicle functions and/or applications may be stored. Alternatively, sources for the grammar elements may be identified. In certain embodiments, respective subsets of the grammar elements may be associated with various vehicle functions and/or applications. Additionally, in certain embodiments, a wide variety of different types of configuration information may be taken into account during the configuration of the grammar elements and/or speech recognition association with the grammar elements. For example, one or more users of the vehicle (e.g., a driver) may be identified, and user profile information may be obtained for the one or more users. The user profile information may be utilized to identify user-specific grammar elements and/or inputs (e.g., gestures, input element identifications, input element selections, etc.) associated with various functions.

As desired, a wide variety of suitable methods and/or techniques may be utilized to identify a user. For example, a voice sample of a user may be collected and compared to a stored voice sample. As another example, image data for the user may be collected and evaluated utilizing suitable facial recognition techniques. As another example, other biometric inputs (e.g., fingerprints, etc.) may be evaluated to identify a user. As yet another example, a user may be identified based upon determining a pairing between the vehicle and a user device (e.g., a mobile device, etc.) and/or based upon the receipt and evaluation of user identification information (e.g., a personal identification number, etc.) entered by the user.

At block 410, user input associated with the vehicle may be received and/or identified. A wide variety of different types of user inputs may be identified as desired in various embodiments. For example, at block 415, a user gesture (e.g., a gesture made by a user's hand, an indication of an input element, etc.) may be identified based at least in part upon an evaluation of image data received from an image sensor. As another example, at block 420, proximity of the user (e.g., a user's hand, etc.) to an input element (e.g., a physical input element, an input region, etc.) may be determined based at least in part upon data received from one or more proximity sensors. As yet another example, at block 425, a user selection of one or more input elements (e.g., physical input elements) may be identified.

At block 430, a vehicle function may be selected or identified based at least in part upon an evaluation of the identified user input. A subset of the grammar elements associated with the selected function may then be identified at block 435. In certain embodiments, the subset of grammar elements for a function may be pared down based at least in part upon the user input. For example, if the user input is associated with altering the volume of an audio system, then the function may be identified as an audio control function associated with audio control grammar elements. Based upon a determination that the user input is associated with volume control, the audio control grammar elements may be limited to volume control grammar elements. In other embodiments, the subset of grammar elements associated with the selected function may be biased and/or weighted based upon the received user input. Using the above example of an audio control function, audio control grammar elements may be selected and biased towards volume control.

At block 440, audio input may be received from any number of suitable audio collection devices (e.g., microphones). In certain embodiments, the collection of audio input may be initiated based at least in part upon the identified user input. For example, when a function is selected, a microphone may be turned on or activated. In other embodiments, the identified user input may be utilized to identify relevant collected audio input. For example, a buffer may be utilized to store recently collected audio input. Once a user input is identified, audio input captured immediately prior to, during, and/or immediately after the user input may be identified for processing. In either case, the collected audio may be evaluated at block 445 utilizing the grammar elements associated with the identified function. In this regard, a grammar element (or plurality of grammar elements) or command associated with the identified function may be identified as corresponding to the collected audio input.

Once a grammar element (or plurality of grammar elements) associated with the function has been identified as matching or otherwise corresponding to the audio input, a wide variety of suitable information associated with the grammar element may be output at block 450, such as an indication of the identified grammar element or a control signal associated with the function. For example, if an audio system function has been identified, then an "up" command may be identified and processed in order to turn the volume of the radio up. As another example, if a window function has been identified, then an "up" command may be identified and processed in order to roll a window up. As yet another example, if a seat control function has been identified, then a "firmer," "softer," or "more lumbar support" command may be processed in order to adjust seat controls. Indeed, a wide variety of suitable commands may be processed with respect to various vehicle functions. The method 400 may end following block 450.

Figure 5:
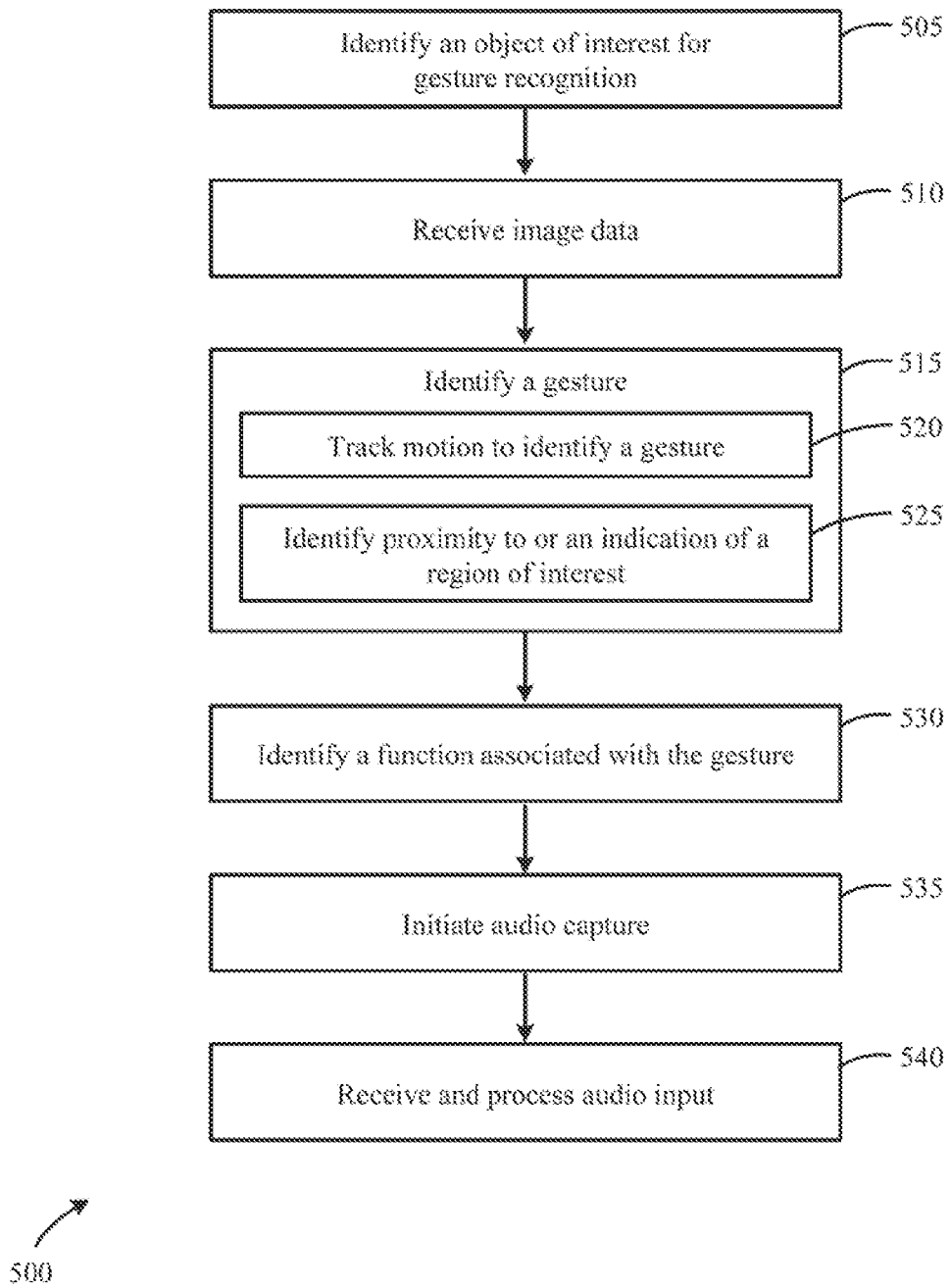
FIG. 5 is a flow diagram of an example method for identifying a gesture associated with the targeting of speech recognition.

FIG. 5 is a flow diagram of an example method 500 for identifying a gesture associated with the targeting of speech recognition. The method 500 illustrates one example implementation of the operations of block 415 illustrated in FIG. 4, as well as the subsequent evaluation of received audio input. As such, the operations of the method 500 may be performed by a suitable speech recognition system and/or one or more associated modules and/or applications, such as the speech recognition system 300 and/or the associated input processing modules 350 and/or the speech recognition modules 352 illustrated in FIG. 3. The method 500 may begin at block 505.

At block 505, an object of interest for purposes of gesture recognition may be identified. For example, a user's hand (e.g., a driver's hand, etc.) may be identified based upon an evaluation of image data collected by one or more image sensors utilizing any number of suitable image recognition techniques. At block 510, image data associated with the identified object of interest may be received. For example, an image sensor may capture images associated with the movement of the object of interest, and the captured images may be received for processing. Alternatively, the image sensor may process the captured images, and information associated with the performed processing (e.g., information associated with identified gestures, etc.) may be received.

At block 515, a gesture associated with the object of interest may be identified. A wide variety of different types of gestures may be identified as desired in various embodiments of the invention. For example, at block 520, motion of the object of interest may be tracked and evaluated in order to identify a gesture, such as a user making any number of motions and/or object configurations (e.g., a back and forth motion to denote control of a sunroof, an up and down motion to denote control of a window, a sequence of motions and/or hand configurations associated with control of an audio system or climate control system, etc.). As another example, at block 525, proximity of the object to and/or an indication of a region or object of interest may be identified, such as a user pointing to an input element or other object (e.g., pointing to a window, pointing to an audio control panel, pointing to an input region, etc.) or the user placing the object of interest in a position near to or touching an input element or other object.

At block 530, a function associated with an identified gesture may be identified or determined. In this regard, grammar elements associated with the function may be identified and/or accessed. Additionally, audio capture may be initiated and/or evaluated at block 535, and received audio input may be processed at block 540 in order to identify and/or process voice commands associated with the function. The method may end following block 540.

Figure 6:
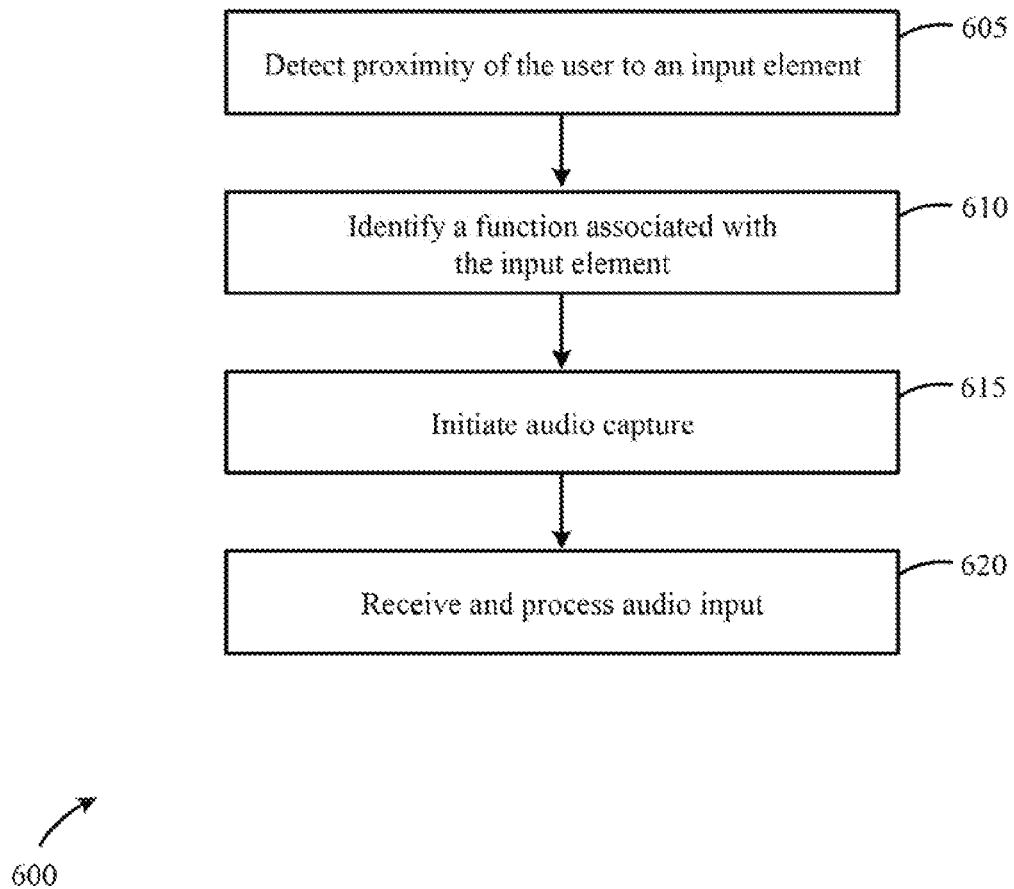
FIG. 6 is a flow diagram of an example method for identifying proximity information associated with the targeting of speech recognition.

FIG. 6 is a flow diagram of an example method for identifying proximity information associated with the targeting of speech recognition. The method 600 illustrates one example implementation of the operations of block 420 illustrated in FIG. 4, as well as the subsequent evaluation of received audio input. As such, the operations of the method 600 may be performed by a suitable speech recognition system and/or one or more associated modules and/or applications, such as the speech recognition system 300 and/or the associated input processing modules 350 and/or the speech recognition modules 352 illustrated in FIG. 3. The method 600 may begin at block 605.

At block 605, the proximity of the user and/or an object associated with the user (e.g., a user's hand, a user's finger, etc.) to an input element (e.g., a physical input element, an input region, etc.) may be detected utilizing any number of suitable proximity sensors. At block 610, a function associated with the input element may be identified or determined. In this regard, grammar elements associated with the function may be identified and/or accessed. Additionally, audio capture may be initiated and/or evaluated at block 615, and received audio input may be processed at block 620 in order to identify and/or process voice commands associated with the function. The method 600 may end following block 620.

Figure 7:
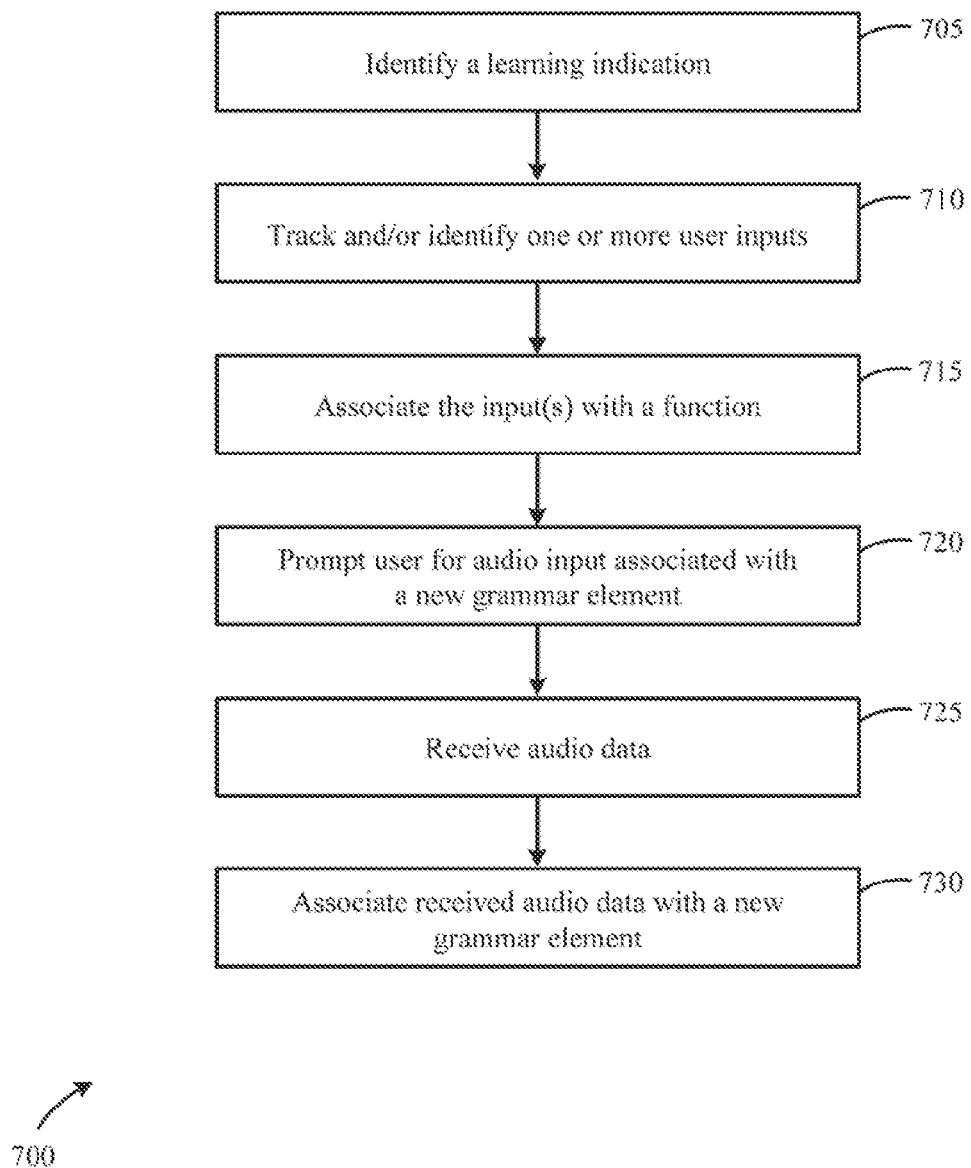
FIG. 7 is a flow diagram of an example method for associating user inputs with grammar elements for speech recognition.

FIG. 7 is a flow diagram of an example method 700 for associating user inputs with grammar elements for speech recognition. In certain embodiments, the operations of the method 700 may be performed by a suitable speech recognition system and/or one or more associated modules and/or applications, such as the speech recognition system 300 and/or the associated input processing modules 350 and/or the speech recognition modules 352 illustrated in FIG. 3. The method 700 may begin at block 705.

At block 705, a learning indication may be identified. For example, a learn new input function or indication may be identified based upon received user input (e.g., a learning gesture, a voice command, a selection of associated input elements, etc.). In certain embodiments, a learning indication may be identified in association with a designated function. In other embodiments, a learning indication may be identified, and a function may be subsequently designated, selected, or defined. Once a learning indication has been identified, a learning mode may be entered.

At block 710, one or more user inputs (e.g., gestures, proximities to input elements, selection of input elements, etc.) may be tracked and/or identified. The tracked one or more user inputs may then be associated with a desired function at block 715, such as a function selected and/or otherwise specified by a user. In this regard, a user may define or specify user inputs associated with the selection of a particular function for targeted voice recognition.

Additionally, in certain embodiments, the user may be prompted at block 720 for audio input to be associated with the function. In this regard, grammar elements for the function may be modified and/or new grammar elements for the function may be established. Following a prompting for audio input, audio data may be received (e.g., collected from one or more suitable audio capture devices, etc.) at block 725. At block 730, at least a portion of the received audio data may be associated with grammar elements (e.g., grammar elements to be modified, new grammar elements, etc.) for the function. Indeed, a wide variety of customization may be performed on behalf of the user as desired in various embodiments. The operations of the method 700 may end following block 730.

The operations described and shown in the methods 400, 500, 600, and 700 of FIGS. 4-7 may be carried out or performed in any suitable order as desired in various embodiments of the invention. Additionally, in certain embodiments, at least a portion of the operations may be carried out in parallel. Furthermore, in certain embodiments, less than or more than the operations described in FIGS. 4-7 may be performed.

Certain embodiments of the disclosure described herein may have the technical effect of targeting speech recognition based at least in part upon an evaluation of received user input. For example, in a vehicular environment, a gesture, selection of input elements, and/or other inputs made by a user may be utilized to identify a desired function, and grammar elements associated with the function may be identified for speech recognition purposes. As a result, relatively efficient and intuitive speech recognition may be performed without the user traversing through a hierarchy of speech commands.

Certain aspects of the disclosure are described above with reference to block and flow diagrams of systems, methods, apparatus, and/or computer program products according to example embodiments. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some embodiments.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, certain embodiments may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. A vehicle comprising:
    at least one memory configured to store a plurality of grammar elements associated with audible commands for the vehicle;
    at least one microphone;
    at least one user input capture device, wherein the at least one user input capture device comprises a sensor that detects a proximity of an arm, a hand, or a finger of a user to a vehicle function control input element; and
    one or more processors configured to:
        identify, based upon information received from the sensor, a user input associated with the vehicle function control input element;
        select, based at least in part upon an evaluation of the identified user input, a function associated with the vehicle function control input element, wherein the function is associated with a subset of the plurality of stored grammar elements;
        receive audio input from the at least one microphone;
        identify, based upon an evaluation of the received audio input, a grammar element associated with the selected function; and
        output information associated with the identified grammar element.

2. The vehicle of claim 1, wherein the identified user input comprises one of a user gesture.

3. The vehicle of claim 2, wherein the at least one input capture device comprises at least one image capture device, and
    wherein the one or more processors are further configured to receive one or more images from the at least one image capture device and determine the user gesture from the one or more images.

4. The vehicle of claim 2, wherein the user gesture is determined based at least in part upon at least one of: tracking hand movement or determining contact or proximity of a hand or finger to a defined region within the vehicle.

5. The vehicle of claim 1, wherein the one or more processors are further configured to initiate, based upon the identification of the user input, the receipt of audio input.

6. The vehicle of claim 1, wherein the output information comprises one or more of a vehicle control command, a climate control command, an audio system command, a window control command, a seat control command, a display control command, a Web command, or a communications control command.

7. The vehicle of claim 1, wherein the one or more processors are further configured to:
    identify a learn new input indication;

track, based at least in part upon identifying the learn new input indication, one or more learn new user inputs; and associate the tracked one or more learn new user inputs with a learn new input function.

8. The vehicle of claim 7, wherein the one or more processors are further configured to:

direct an output of a prompt for a user to speak one or more words associated with a first grammar element to be associated with control of the learn new input function;

receive audio data collected in response to the prompt; and associate at least a portion of the received audio data with the first grammar element.

9. A method comprising executing computer-executable instructions by one or more processors, the method further comprising:

storing a plurality of grammar elements associated with audible commands for a vehicle;

identifying a user input associated with the vehicle function control input element, based at least upon information received from a sensor, wherein the information is indicative of a proximity of an arm, a hand, or a finger of a user to the vehicle function control input element;

selecting, based at least in part upon an evaluation of the identified user input, a function associated with the vehicle function control input element, wherein the function is associated with a subset of the plurality of stored grammar elements;

receiving audio input from at least one audio capture device associated with the vehicle;

identifying, based upon an evaluation of the received audio input, a grammar element associated with the selected function; and outputting information associated with the identified grammar element.

10. The method of claim 9, wherein identifying the user input comprises identifying at least one of: a user gesture.

11. The method of claim 10, wherein identifying the user input comprises:

receiving one or more images from at least one image capture device; and determining, from the one or more images, the user gesture.

12. The method of claim 10, wherein determining the user gesture comprises at least one of: determining the gesture based at least in part upon tracking hand movement or determining the gesture based at least in part upon contact or proximity of a hand or finger to a defined region within the vehicle.

13. The method of claim 9, further comprising:

initiating, based upon the identification of the user input, the receipt of audio input.

14. The method of claim 9, wherein outputting information comprises outputting one or more of a vehicle control command, a climate control command, an audio system command, a window control command, a seat control command, a display control command, a Web command, or a communications control command.

15. The method of claim 9, further comprising:

identifying a learn new input indication;

tracking, based at least in part upon identifying the learn new input indication, one or more learn new user inputs; and associating the tracked one or more learn new user inputs with a learn new input function.

16. The method of claim 15, further comprising:

prompting a user to speak one or more words associated with a first grammar element to be associated with control of the learn new input function;

receiving audio data in response to the prompting; and associating at least a portion of the received audio data with the first grammar element.

17. An apparatus comprising one or more processors configured to:

store a plurality of grammar elements associated with audible commands for a vehicle;

identify a user input associated with the vehicle function control input element, based at least upon information received from a sensor, wherein the information is indicative of a proximity of an arm, a hand, or a finger of a user to the vehicle function control input element;

select, based at least in part upon an evaluation of the identified user input, a function associated with the vehicle function control input element, wherein the function is associated with a subset of the plurality of stored grammar elements;

receive audio input;

identify, based upon an evaluation of the received audio input, a grammar element associated with the selected function; and output information associated with the identified grammar element.

18. The apparatus of claim 17, wherein the identified user input comprises at least one of a user gesture.

19. The apparatus of claim 18, wherein the apparatus is further configured to:

receive one or more images from at least one image capture device; and determine the user gesture from the one or more images.

20. The apparatus of claim 18, wherein the user gesture is determined based at least in part upon one of tracking hand movement or determining contact or proximity of a hand or finger to a defined region within the vehicle.

21. The apparatus of claim 17, wherein the apparatus is further configured to initiate, based upon the identification of the user input, the receipt of audio input.

22. The apparatus of claim 17, wherein the output information comprises one or more of a vehicle control command, a climate control command, an audio system command, a window control command, a seat control command, a display control command, a Web command, or a communications control command.

23. The apparatus of claim 17, wherein the apparatus is further configured to:

identify a learn new input indication;

track, based at least in part upon identifying the learn new input indication, one or more learn new user inputs; and associate the tracked one or more learn new user inputs with a learn new function.

24. One or more non-transitory computer-readable media storing computer-executable instructions that, when executed by one or more processors, cause the one or more processors to perform operations comprising:

identifying a plurality of stored grammar elements associated with audible commands for a vehicle;

identifying a user input associated with the vehicle function control input element, based at least upon information received from a sensor, wherein the information is indicative of a proximity of an arm, a hand, or a finger of a user to the vehicle function control input element;

selecting, based at least in part upon an evaluation of the identified user input, a function associated with the vehicle function control input element, wherein the function is associated with a subset of the plurality of stored grammar elements;
receiving audio input;
identifying, based upon an evaluation of the received audio input, a grammar element associated with the selected function; and
outputting information associated with the identified grammar element.

25. The one or more non-transitory computer-readable media of claim 24, wherein the identified user input comprises at least one of a user gesture.

26. The one or more non-transitory computer-readable media of claim 25, wherein the one or more processors are further configured to:
receive one or more images from at least one image capture device; and
determine the user gesture from the one or more images.

27. The one or more non-transitory computer-readable media of claim 25, wherein the user gesture is determined based at least in part upon one of: tracking hand movement or determining contact or proximity of a hand or finger to a defined region within the vehicle.

28. The one or more non-transitory computer-readable media of claim 24, wherein the one or more processors are further configured to initiate, based upon the identification of the user input, the receipt of audio input.

29. The one or more non-transitory computer-readable media of claim 24, wherein the output information comprises one or more of a vehicle control command, a climate control command, an audio system command, a window control command, a seat control command, a display control command, a Web command, or a communications control command.

30. The one or more non-transitory computer-readable media of claim 24, wherein the one or more processors are further configured to:
identify a learn new input indication;
track, based at least in part upon identifying the learn new input indication, one or more learn new user inputs; and
associate the tracked one or more learn new user inputs with a learn new function.

\* \* \* \* \*